(12) United States Patent
Hiremath

(10) Patent No.: US 10,822,274 B1
(45) Date of Patent: Nov. 3, 2020

(54) RESPIRABLE SILICA-FREE JOINT COMPOUND FORMULATION

(71) Applicant: Board-Sil, LLC, Aldie, VA (US)

(72) Inventor: Vaidehi Hiremath, Aldie, VA (US)

(73) Assignee: Board-Sil, LLC, Aldie, VA (US)

( * ) Notice: Subject to any disclaimer, the term of this patent is extended or adjusted under 35 U.S.C. 154(b) by 49 days.

(21) Appl. No.: 16/053,070

(22) Filed: Aug. 2, 2018

Related U.S. Application Data

(60) Provisional application No. 62/540,471, filed on Aug. 2, 2017.

(51) Int. Cl.
| | |
|---|---|
| *C04B 24/06* | (2006.01) |
| *C04B 26/28* | (2006.01) |
| *C04B 14/28* | (2006.01) |
| *C04B 14/18* | (2006.01) |
| *C04B 24/38* | (2006.01) |
| *B32B 37/12* | (2006.01) |
| *C04B 111/00* | (2006.01) |

(52) U.S. Cl.
CPC ............ *C04B 26/285* (2013.01); *B32B 37/12* (2013.01); *C04B 14/18* (2013.01); *C04B 14/28* (2013.01); *C04B 24/06* (2013.01); *C04B 24/386* (2013.01); *B32B 2607/00* (2013.01); *C04B 2111/00637* (2013.01); *C04B 2111/00672* (2013.01)

(58) Field of Classification Search
CPC ......... C04B 28/14; C04B 22/10; C04B 22/16; C04B 2103/22; C04B 22/142; C04B 22/147; C04B 24/123; C04B 26/285; C04B 14/18; C04B 14/28; B32B 37/12
USPC ........................................................ 156/325
See application file for complete search history.

(56) References Cited

U.S. PATENT DOCUMENTS

| | | | | |
|---|---|---|---|---|
| 2001/0011112 | A1* | 8/2001 | Langford | ................ C04B 26/02 524/5 |
| 2014/0100309 | A1* | 4/2014 | Rosenthal | ............... C04B 26/04 524/35 |

\* cited by examiner

*Primary Examiner* — Hannah J Pak
(74) *Attorney, Agent, or Firm* — Foley & Lardner LLP

(57) ABSTRACT

Materials and methods for joining wallboard panels may include joint compounds that include one or more filler materials (e.g., perlite, calcium carbonate, kaolin, and attapulgite), binder materials (e.g., polyvinyl acetates, acrylics, polyvinyl alcohols, re-dispersible powders, ethylene vinyl acetates, and starches), additives (e.g., hydroxypropylmethyl cellulose, preservatives, Potassium Bitartrate, antifreeze and/or plasticizers), thickeners, and/or suspending agents.

8 Claims, 1 Drawing Sheet

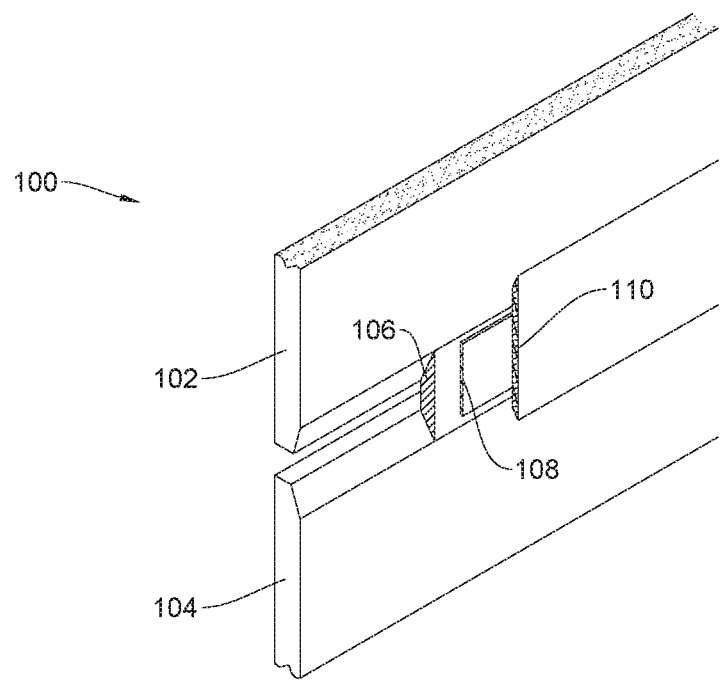

RESPIRABLE SILICA-FREE JOINT COMPOUND FORMULATION

CROSS-REFERENCE TO RELATED APPLICATIONS

This application claims the benefit of priority to U.S. Provisional Patent Application No. 62/540,471 filed on Aug. 2, 2017, the contents of which are incorporated herein by reference in their entirety for any and all purposes.

FIELD

The present disclosure relates generally to compositions of use in the construction industry, and more specifically to compositions of use in joining construction components.

BACKGROUND

Interior walls and ceilings are often constructed utilizing a plurality of panels, e.g., gypsum wallboards. During construction, the panels are commonly joined using joint compounds (ordinarily referred to as "mud", "joint cement", and "drywall compound", among other names) and a permeable tape (often referred to as "joint tape").

Traditionally, joint compounds include materials that have been deemed to be potentially damaging to human health (e.g., talc, mica, silica, and the like), and as a result there have been efforts to replace these materials with materials that are generally considered safer (e.g., organic binders). As such, there is a continuing need to provide formulations for joint compounds that exhibit desired qualities (e.g., use safety, density, ease of sanding, and adhesive properties, among others).

SUMMARY

Disclosed herein are materials and methods for joining wallboard panels and the like. In embodiments disclosed herein, joint compound layers are implemented as joint compounds including one or more filler materials, binder materials, additives, thickeners, and/or suspending agents. In these embodiments, suitable filler materials include one or more of perlite, calcium carbonate (e.g., in the form of limestone), kaolin, attapulgite, and the like. In some embodiments, the filler material in the joint compound may be calcium carbonate, present in the form of substantially dolomitic limestone, within a range of approximately 60-80 wt. %. In other embodiments, suitable binder materials include polyvinyl acetates, acrylics, polyvinyl alcohols, re-dispersible powders (e.g., polyvinyl acetate), ethylene vinyl acetates, starches, starch-based binders, and the like. In some embodiments, a starch-based polymer (e.g., a modified corn based starch polymer) is included from about 5 wt. % to about 25 wt. %.

In other embodiments, joining compounds may include suitable additives and/or thickeners such as, for example, hydroxypropylmethyl cellulose (HPMC) (e.g., from about 1 to 7 wt. %), preservatives, antifreeze and/or plasticizers, Potassium Bitartrate (e.g., from about 1 to 7 wt. %), and the like.

In yet other embodiments, joint compounds may include suitable suspending agents, such as for example one or more clays (e.g., attapulgite and the like) present from about 1-9 wt. %.

In some embodiments, joint compounds include dolomitic limestone filler, corn based starch polymer as a binder, attapulgite clay as a suspending agent, and a suitable combination of additives (e.g., HPMC, Potassium Bitartrate, and preservatives) and are substantially free of silica, mica, talc, latex, and polyvinyl acetate (PVA). In some embodiments, joint compounds include dolomitic limestone filler, corn based starch polymer as a binder, attapulgite clay as a suspending agent, and a suitable combination of additives (e.g., HPMC, Potassium Bitartrate, and preservatives) and are substantially free of mica, talc, latex, and polyvinyl acetate (PVA) and no traces of respirable crystalline silica. In other embodiments, joint compounds disclosed herein are suitable for use as a finishing compound and sanding to a smooth finish. In yet other embodiments, joint compounds may be made commercially available in a paste-form, or may be sold as a powder to which a suitable solvent (e.g., water) may be added.

Provided herein, in one aspect, are joint compound formulations comprising substantially no respirable crystalline silica. In some embodiments, the joint compound formulation further comprises no mica and/or no talc. In some embodiments, the joint compound formulation comprises at least one latex-free binder. In some embodiments, the binder comprises one or more of the group consisting of starches and starch-based binders. In some embodiments, the binder comprises a starch-based polymer. In some embodiments, the binder is present in the formulation in an amount of from about 5 wt. % to about 25 wt. %. In some embodiments, the joint compound formulation further comprises one or more fillers. In some embodiments, the one or more fillers comprise one of more of the group consisting of Perlite, calcium carbonate, hydroxypropylmethyl cellulose, kaolin, and attapulgite. In some embodiments, the one or more fillers comprise calcium carbonate and the calcium carbonate is in the form of dolomitic limestone. In some embodiments, the one or more fillers are present in the formulation in an amount of from about 60 wt. % to about 80 wt. %. In some embodiments, the joint compound formulation further comprises one or more additives and/or one or more thickeners. In some embodiments, the one or more thickeners comprise hydroxypropylmethyl cellulose, carboxymethyl cellulose, or a combination thereof. In some embodiments, the one or more additives comprise one or more of the group consisting of preservatives, antifreeze, plasticizers, suspending agents, and setting timing retardants. In some embodiments, the suspending agents comprise attapulgite clay, other clays, or a combination thereof. In some embodiments, the antifreeze and plasticizers comprise propylene glycol, ethylene glycol, or a combination thereof. In some embodiments, the setting timing retardants comprise Potassium Bitartrate. In some embodiments, the joint compound formulation is in the form of paste or a powder. In some embodiments, the joint compound formulation is in the form of powder. In some embodiments, the joint compound formulation is suitable for use as a finishing compound and sanding to a smooth finish. In some embodiments, the joint compound formulation exhibits a coverage rating of about 15 lbs. to cover an area of about 125 square feet.

Provided herein, in another aspect, are compositions comprising about 50 wt. % to about 80 wt. % of limestone powder; about 1 wt. % to about 7 wt. % of perlite; about 5 wt. % to 25 wt. % of a corn-based starch polymer; about 1 wt. % to about 7 wt. % of hydroxypropylmethyl cellulose; about 1 wt. % to about 5 wt. % of Potassium Bitartrate; and about 0.1 wt. % to about 5 wt. % of one or more preservatives, wherein the composition is a joint compound composition that is substantially free of mica, talc, latex, and polyvinyl acetate and no traces of respirable crystalline silica. In some embodiments, the composition further comprises from about 0.5 wt. % to about 3 wt. % propylene glycol, ethylene glycol, or a combination thereof.

Provided herein, in another aspect, are methods for joining two or more wallboard panels, the method comprising applying a joint compound formulation comprising no traces of respirable crystalline silica to join the two or more wallboard panels.

Provided herein, in another aspect, are methods for repairing one or more cracks in a plastered wall, the method comprising applying a joint compound formulation comprising no traces of respirable crystalline silica to the one or more cracks.

Provided herein, in another aspect, are method of laminating gypsum board to another surface, the method comprising applying a layer of joint compound formulation comprising no traces of respirable crystalline silica to the gypsum board and affixing the other surface onto the layer of joint compound formulation; or applying a layer of joint compound formulation comprising no traces of respirable crystalline silica to the other surface and affixing the gypsum board onto the layer of joint compound formulation.

BRIEF DESCRIPTION OF THE DRAWINGS

The disclosure may be best understood by referring to the following description and accompanying drawings that are used to illustrate embodiments of the disclosure by way of example and not limitation, without departing from the spirit and scope of the disclosure. In the drawings, like reference numerals indicate similar elements.

FIG. 1 is an isometric section view displaying a joint structure, according to an embodiment.

DETAILED DESCRIPTION

In the following description, numerous specific details are set forth. However, it is understood that embodiments of the invention may be practiced without these specific details. In other instances, well-known structures, and techniques have not been shown in detail in order not to obscure the understanding of this description.

In the following description, reference is made to the accompanying drawings, which illustrate several embodiments of the present invention and may not be represented to scale. It is understood that other embodiments may be utilized, and mechanical compositional, structural, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The terms "or" and "and/or" as used herein are to be interpreted as inclusive or meaning any one or any combination. Therefore, "A, B, or C" or "A, B, and/or C" mean any of the following: A; B; C; A and B; A and C; B and C; A, B and C." An exception to this definition will occur only when a combination of elements, functions, steps or acts are in some way inherently mutually exclusive.

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

FIG. 1 depicts Joining Structure 100, according to an embodiment. In FIG. 1, Joining Structure 100 includes first Drywall Panel 102 and second Drywall Panel 104, Drywall Panel 102 being operatively connected to Drywall Panel 104 by a first Joint Compound Layer 106. Joint Tape 108 is placed atop Joint Compound Layer 106, covering one or more portions of Joint Compound Layer 106. A second Joint Compound Layer 110 is placed atop of and substantially covering Joint Tape 108, and further covers one or more portions of Joint Compound Layer 106 not covered by Joint Tape 108.

In some embodiments, Drywall Panel 102 and Drywall Panel 104 are implemented as commercially available wallboard panels. In an example, Drywall Panel 102 is implemented as a wallboard panel comprising gypsum and is attached to a support structure, not shown, using any attachment techniques and/or mechanisms known in the art such as for example rivets, staples, bolts, nails, screws, adhesives, and the like. In this example, Drywall Panel 104 is implemented as a wallboard panel substantially similar Drywall Panel 102.

In other embodiments, Joint Compound Layer 106 is implemented as a joint compound including one or more filler materials and one or more binder materials. In an example, suitable filler materials for use in the formulation of a joint compound suitable for producing Joint Compound Layer 106 include one or more of perlite, calcium carbonate (e.g., in the form of limestone), kaolin, attapulgite, and the like. In this example, the type of filler material used in the joint compound is selected according to the requirements of the particular application in which it will be used. In a further example, calcium carbonate may be selected as the main filler material in an environmentally friendly joint compound. In this example, calcium carbonate is present in the form of substantially dolomitic limestone and is present in the joint compound in a range of approximately 60-80 wt. %. In some embodiments, the filler may comprise, consist essentially of, or consist of one of more of the group consisting of Perlite, calcium carbonate, hydroxypropylmethyl cellulose, kaolin, and attapulgite. In some embodiments, the filler is present in the joint compound formulation in an amount of about 50 wt. % to 70 wt. %. In some embodiments, the filler is present in the joint compound formulation in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt. %, including increments therein, or ranges between any two of these values (including endpoints).

In another example, suitable binder materials for use in the formulation of a joint compound suitable for producing Joint Compound Layer 106 include polyvinyl acetates, acrylics, polyvinyl alcohols, re-dispersible powders (e.g., polyvinyl acetate), ethylene vinyl acetates, starches, starch-based binders, and the like. In this example, the type of binder material used in the joint compound is selected according to the requirements of the particular application in which it will be used. In some embodiments, the binder comprises, consists essentially of, or consists of a latex-free binder. In some embodiments, the binder comprises, consists essentially of, or consists of one or more of the group consisting of starches and starch-based binders. In a further example, a starch-based binder may be selected as the main binder material in an environmentally friendly joint compound. In this example, the starch-based binder is implemented as a modified corn based starch polymer (e.g., STAR*POL® 136 and STARAMIC™ 747, both of which are made commercially available by Tate & Lyle; INSTANT PURE-COTE® B792, produced by Grain Processing Corporation) from about 5 wt. % to about 25 wt. %. In some embodiments, the binder is present in the joint compound formulation in an amount of about 5, 6, 7, 8, 9, 10, 11, 12, 13, 14, 15, 16, 17, 18, 19, 20, 21, 22, 23, 24, or 25 wt. %, including increments therein, or ranges between any two of these values (including endpoints).

In some embodiments, joint compounds suitable for use in producing Joint Compound Layer 106 may include one or more additives and/or thickeners. In some embodiments, the one or more additives comprise, consist essentially of, or consist of one or more of the group consisting of preservatives, antifreeze, plasticizers, suspending agents, and setting timing retardants. In some embodiments, the one or more thickeners comprise, consist essentially of, or consist of hydroxypropylmethyl cellulose, carboxymethyl cellulose, or a combination thereof. Although hydroxypropylmethyl cellulose and carboxymethyl cellulose are mentioned herein as a suitable thickener, it should be understood that other types of thickeners, and in particular other cellulose ethers, may also be employed as a thickener. For instance, the thickener may include, but is not limited to, methylcellulose, hydroxyethylmethyl cellulose, hydroxylpropylmethyl cellulose, hydroxypropyl cellulose, hydroxyethyl cellulose, ethylhydroxyethyl cellulose, carboxymethyl cellulose, or mixtures thereof. Accordingly, any reference to hydroxypropylmethyl cellulose with respect to a specific joint compound formulation herein may be substituted with any other of the aforementioned cellulose ethers. In some embodiments, the one or more thickeners are present in the joint compound formulation in an amount of about 1 wt. % to about 15 wt. %. This includes one or more thickeners present in the joint compound formulation in an amount of about 1, 2, 3, 4, 5, 6, 7, 8, 9, 10, 11, 12, 13, 14, or 15 wt. %, including increments therein, or ranges between any two of these values (including endpoints). In an example, a hydroxypropylmethyl cellulose (HPMC) with delayed solubility may be included (e.g., in the range of 1 to 7 wt. %) in an environmentally friendly joint compound. In this example, the HPMC (e.g., METHOCEL™ 240s, distributed by Dow Chemical Co.) may act as a thickener, impart water demand, tape bond, crack resistance and workability, and enhance water retention. In yet further examples, preservatives may be added to joint compounds to prevent bacterial and fungal growth and deter the deterioration of organic components included in the joint compound. In these examples, additives functioning as preservatives suitable for use in said joint compounds may be substantially free of formaldehyde, and as a result said joint compounds may be substantially free of volatile organic compounds (e.g., with a total concentration of volatile organic compounds in a range of less than 1000 ppm). In some embodiments, the preservative is present in the joint compound formulation in an amount of about 0.1 wt. % to 1 wt. %. This includes preservative present in the joint compound formulation in an amount of about 0.1, 0.15, 0.20, 0.25, 0.30, 0.35, 0.40, 0.45, 0.50, 0.55, 0.60, 0.65, 0.70, 0.75, 0.80, 0.85, 0.90, 0.95, or 1 wt. %, including increments therein, or ranges between any two of these values (including endpoints). In other examples, the joint compound may include antifreeze and/or plasticizers (e.g., propylene glycol, ethylene glycol, combinations, and the like). In some embodiments, the antifreeze and/or plasticizers are present in the joint compound formulation in an amount of about 1 wt. % to about 5 wt. %. This includes antifreeze and/or plasticizers present in the joint compound formulation in an amount of about 0.4, 0.5, 0.6, 0.7, 0.8, 0.9 1, 2, 3, 4, or 5 wt. %, including increments therein, or ranges between any two of these values (including endpoints). In yet other examples, Potassium Bitartrate may be added joint compounds (e.g., in the range of 1 to 5 wt. %) and may aid in water retention and/or maintaining the pH of the joint compound within a desired range. Although potassium bitartrate is mentioned herein as a suitable additive, such as for water retention and/or maintaining the pH, it should be understood that other tartrate, in particular bitartrates, may also be employed. As generally known in the art, a tartrate is a salt of a tartaric acid. In this regard, the tartrate may be a bitartrate and may be complexed with an alkali metal and/or an alkaline earth metal. For instance, the alkali metal may be lithium, sodium, potassium, or any mixture thereof. The alkaline earth metal may be magnesium, calcium, or a mixture thereof. Accordingly, any reference to potassium bitartrate with respect to a specific joint compound formulation herein may be substituted with any other of the aforementioned tartrate compounds. In some embodiment, Potassium Bitartrate, or other tartrate compound, is present in the joint compound formulation in an amount of about 0.05 wt. % to about 5 wt. %. This includes Potassium Bitartrate, or other tartrate compound, present in the joint compound formulation in an amount of about 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 3, 3.05, 3.10, 3.15, 3.20, 3.25, 3.30, 3.35, 3.40, 3.45, 3.50, 3.55, 3.60, 3.65, 3.70, 3.75, 3.80, 3.85, 3.90, 3.95, 4, 4.05, 4.10, 4.15, 4.20, 4.25, 4.30, 4.35, 4.40, 4.45, 4.50, 4.55, 4.60, 4.65, 4.70, 4.75, 4.80, 4.85, 4.90, 4.95, or 5 wt. %, including increments therein, or ranges between any two of these values (including endpoints).

In other embodiments, joint compounds suitable for use in producing Joint Compound Layer 106 may include one or more suspending agents. In an example, said one or more suspending agents may include one or more clays (e.g., attapulgite and the like) and may be present in the joint compound in the range of approximately 1-9 wt. %. In some embodiments, the suspending agents comprise, consist essentially of, or consist of attapulgite clay, other clays, or a combination thereof. In some embodiments, the other clays comprise consist essentially of, or consist of kaolin. A non-limiting example of kaolin is POLYPLATE® P, produced by KaMin LLC.

In another example, Joint Compound Layer 106 comprises a joint compound including a suitable dolomitic limestone filler, a corn based starch polymer as a binder, attapulgite clay as a suspending agent, and a suitable combination of additives including HPMC, Potassium Bitartrate, and preservatives. In this example, the joint compound is substantially free of respirable crystalline Silica, Mica, Talc, Latex, and PVA. Further to this example, the joint compound may be suitable for use as a finishing compound and, once dried, may be sanded to a smooth finish. Yet further to this example, the joint compound may be made commercially available in a paste-form, or may be sold as a powder to which a suitable solvent (e.g., water) may be added to form a paste of use in the desired application.

In another example, Joint Compound Layer 106 comprises a joint compound including a suitable dolomitic limestone filler, a corn based starch polymer as a binder, attapulgite clay as a suspending agent, and a suitable combination of additives including HPMC, Potassium Bitartrate, and preservatives. In this example, the joint compound is substantially free of Silica, Mica, Talc, Latex, and PVA. Further to this example, the joint compound may be suitable for use as a finishing compound and, once dried, may be sanded to a smooth finish. Yet further to this example, the joint compound may be made commercially available in a paste-form, or may be sold as a powder to which a suitable solvent (e.g., water) may be added to form a paste of use in the desired application.

In yet another example, Joint Compound Layer 106 comprises a joint compound including a suitable perlite filler, a corn based starch polymer as a binder, and a suitable combination of additives including HPMC, Potassium Bitartrate, and preservatives. In this example, the joint compound is substantially free of Mica, Talc, Latex, and PVA and no traces of respirable crystalline silica. Further to this example, the joint compound may be suitable for use as a finishing compound and, once dried, may be sanded to a smooth finish. Yet further to this example, the joint compound may be made commercially available in a paste-form, or may be sold as a powder to which a suitable solvent (e.g., water) may be added to form a paste of use in the desired application. Further to this example, the joint compound includes perlite in a range of about 1 to 4 wt. %, starch polymer binder in a range of about 5 to 25 wt. %, HPMC in a range of about 1 to 7 wt. %, Potassium Bitartrate in a range of about 1 to 5 wt. %, and preservatives in a range of about 0.1 to 5 wt. %.

In yet another example, Joint Compound Layer 106 comprises a joint compound including a suitable perlite filler, a corn based starch polymer as a binder, and a suitable combination of additives including HPMC, Potassium Bitartrate, and preservatives. In this example, the joint compound is substantially free of Silica, Mica, Talc, Latex, and PVA. Further to this example, the joint compound may be suitable for use as a finishing compound and, once dried, may be sanded to a smooth finish. Yet further to this example, the joint compound may be made commercially available in a paste-form, or may be sold as a powder to which a suitable solvent (e.g., water) may be added to form a paste of use in the desired application. Further to this example, the joint compound includes perlite in a range of about 1 to 4 wt. %, starch polymer binder in a range of about 5 to 25 wt. %, HPMC in a range of about 1 to 7 wt. %, Potassium Bitartrate in a range of about 1 to 5 wt. %, and preservatives in a range of about 0.1 to 5 wt. %.

In another example, Joint Compound Layer 106 comprises a joint compound including a suitable combination of perlite, attapulgite, kaolin and limestone as a filler, a corn based starch polymer as a binder, and a suitable combination of additives including HPMC, Potassium Bitartrate, and preservatives. In this example, the joint compound is substantially free of mica, talc, latex, and PVA and has no traces of respirable crystalline silica. Further to this example, the joint compound may be suitable for use as a finishing compound and, once dried, may be sanded to a smooth finish. Yet further to this example, the joint compound may be made commercially available in a paste-form, or may be sold as a powder to which a suitable solvent (e.g., water) may be added to form a paste of use in the desired application. Further to this example, the joint compound includes perlite in a range of about 1 to 4 wt. %, attapulgite in range of about 1 to 9 wt. %, kaolin in range of about 1 to 9 wt. % limestone in a range of about 55 to 80 wt. %, starch polymer binder in a range of about 5 to 25 wt. %, HPMC in a range of about 1 to 7 wt. %, Potassium Bitartrate in a range of about 1 to 5 wt. %, and preservatives in a range of about 0.1 to 5 wt. %.

In another example, Joint Compound Layer 106 comprises a joint compound including a suitable combination of perlite, attapulgite, kaolin and limestone as a filler, a corn based starch polymer as a binder, and a suitable combination of additives including HPMC, Potassium Bitartrate, and preservatives. In this example, the joint compound is substantially free of silica, mica, talc, latex, and PVA. Further to this example, the joint compound may be suitable for use as a finishing compound and, once dried, may be sanded to a smooth finish. Yet further to this example, the joint compound may be made commercially available in a paste-form, or may be sold as a powder to which a suitable solvent (e.g., water) may be added to form a paste of use in the desired application. Further to this example, the joint compound includes perlite in a range of about 1 to 4 wt. %, attapulgite in range of about 1 to 9 wt. %, kaolin in range of about 1 to 9 wt. % limestone in a range of about 55 to 80 wt. %, starch polymer binder in a range of about 5 to 25 wt. %, HPMC in a range of about 1 to 7 wt. %, Potassium Bitartrate in a range of about 1 to 5 wt. %, and preservatives in a range of about 0.1 to 5 wt. %.

In some embodiments, the joint compound formulation or joint compound composition comprises or consists essentially of about 50 wt. % to about 80 wt. % of limestone powder; about 1 wt. % to about 7 wt. % of perlite; about 5 wt. % to 25 wt. % of a corn-based starch polymer; about 1 wt. % to about 7 wt. % of hydroxypropylmethyl cellulose; about 1 wt. % to about 5 wt. % of Potassium Bitartrate; and about 0.1 wt. % to about 5 wt. % of one or more preservatives. In some further embodiments, the joint compound formulation or joint compound composition is substantially free of mica, talc, latex, and polyvinyl acetate and does not have any traces of respirable crystalline silica. In still further embodiments, the joint compound formulation or joint compound composition further comprises from about 0.5 wt. % to about 3 wt. % propylene glycol, ethylene glycol, or a combination thereof.

In some embodiments, the joint compound formulation or joint compound composition comprises or consists essentially of about 50 wt. % to about 80 wt. % of limestone powder; about 1 wt. % to about 7 wt. % of perlite; about 5 wt. % to 25 wt. % of a corn-based starch polymer; about 1 wt. % to about 7 wt. % of hydroxypropylmethyl cellulose; about 1 wt. % to about 5 wt. % of Potassium Bitartrate; and about 0.1 wt. % to about 5 wt. % of one or more preservatives. In some further embodiments, the joint compound formulation or joint compound composition is substantially free of silica, mica, talc, latex, and polyvinyl acetate. In still further embodiments, the joint compound formulation or joint compound composition further comprises from about 0.5 wt. % to about 3 wt. % propylene glycol, ethylene glycol, or a combination thereof.

In some embodiments, the joint compound formulation comprises, consists essentially of, or consists of about 10 wt. % to about 17 wt. % of starch-based binder; about 7 wt. % to about 11 wt. % of cellulose (e.g., hydroxypropylmethyl cellulose, carboxymethyl cellulose, or a combination thereof); about 0.1 wt. % to about 0.5 wt. % of preservative; about 50 wt. % to about 70 wt. % of limestone; about 1 wt. % to about 7 wt. % of attapulgite; about 1 wt. % to about 5 wt. % of kaolin; about 0.7 wt. % to about 2 wt. % of ethylene glycol; about 0.5 wt. % to about 2 wt. % of propylene glycol; about 7 wt. % to about 15 wt. % of water; and about 0.05 wt. % to about 2 wt. % of Potassium Bitartrate.

In a comparative example, a first joint compound is prepared including a suitable perlite and limestone filler, a corn based starch polymer as a binder, and suitable preservatives. In this example, a second joint compound is prepared including a suitable perlite and limestone filler, a corn based starch polymer as a binder, and a suitable combination of additives including HPMC, Potassium Bitartrate, and preservatives. In this example, the first joint compound exhibits an open time of about one hour, where open time is defined as the amount of time during which the material exhibits sufficiently adequate properties for use in drywall joining applications as measured from the opening of the container including the joint compound. Further to this example, the first joint compounds exhibit a coverage rating of about 15 lbs. to cover an area of about 100 square feet. In this example, the second joint compound exhibits an open time within a range of about 4 hours to about 10 hours, and a coverage rating of about 15 lbs. to cover an area of about 125 square feet. In another example, the second joint compound exhibits enhanced adhesive and sanding characteristics when compared to the first joint compound.

In some embodiments, the joint compound formulation has the following composition:

| Material | wt. % |
| --- | --- |
| Limestone | >60 |
| POLYPLATEO ® P | <5 |
| Attapulgite | <5 |
| Starch-Based Binder | <15 |
| Hydroxypropyl Methylcellulose | <1 |
| Ethylene Glycol | <3 |
| Propylene Glycol | <3 |
| Potassium Bitartrate | <3 |
| Preservative | <1 |
| Water | <10 |

Although several materials of use in joint compounds suitable for producing Joint Compound Layer 106 are disclosed, other materials imparting desired qualities to the compound known to those skilled in the art may be added without deviating from the disclosure.

In yet other embodiments, Joint Tape 108 is implemented as a permeable tape suitable for use with Joint Compound Layer 106. In an example, Joint Tape 108 is implemented as a water permeable tape made of paper. In another example, Joint Tape 108 is implemented as a Fiberglass Mesh tape. In yet another example, Joint Tape 108 is implemented as a Metal tape.

In other embodiments, Joint Compound Layer 110 is implemented as a layer of joint compound substantially similar to the joint compounds suitable for use in Joint Compound Layer 106. In these embodiments, the joint compound included in Joint Compound Layer 110 is implemented so as to provide a smooth surface finish and may be suitable for sanding once dried. In an example, Joint Compound Layer 110 comprises a joint compound including a suitable dolomitic limestone filler, a corn based starch polymer as a binder, attapulgite clay and perlite as a suspending agent, and a suitable combination of additives including HPMC, Potassium Bitartrate, and preservatives. In this example, the joint compound is substantially free of silica, mica, talc, latex, and PVA.

In some embodiments, the joint compound being "substantially free of silica, mica, talc, latex, and polyvinyl acetate (PVA)" refers to the joint compound comprising less than 1 wt. % of silica, mica, talc, latex, or PVA, or any combination of two or more thereof. In some embodiments, the joint compound being "substantially free of silica, mica, talc, latex, and polyvinyl acetate (PVA)" refers to the joint compound comprising less than 0.5 wt. % of silica, mica, talc, latex, or PVA, or any combination of two or more thereof. In some embodiments, the joint compound being "substantially free of silica, mica, talc, latex, and polyvinyl acetate (PVA)" refers to the joint compound comprising none of group consisting of silica, mica, talc, latex, and PVA.

In some embodiments, the joint compound being "substantially free of mica, talc, latex, and polyvinyl acetate (PVA)" refers to the joint compound comprising less than 1 wt. % of mica, talc, latex, or PVA, or any combination of two or more thereof. In some embodiments, the joint compound being "substantially free of mica, talc, latex, and polyvinyl acetate (PVA)" refers to the joint compound comprising less than 0.5 wt. % of mica, talc, latex, or PVA, or any combination of two or more thereof. In some embodiments, the joint compound being "substantially free of mica, talc, latex, and polyvinyl acetate (PVA)" refers to the joint compound comprising none of group consisting of mica, talc, latex, and PVA.

In some embodiments, the joint compound having "no traces of respirable crystalline silica" refers to the joint compound having no respirable crystalline silica. In some embodiments, the joint compound having "no traces of respirable crystalline silica" refers to the joint compound having less than 0.5 wt. % respirable crystalline silica. As used herein, less than 0.5 wt % respirable crystalline silica includes less than 0.4 wt %, less than 0.3 wt %, less than 0.2 wt %, less than 0.1 wt %, or less than 0.05 wt %. In some embodiments, there is 0.0 wt % respirable crystalline silica in the joint composition.

In one embodiment, "substantially no" respirable crystalline silica, "substantially free" of respirable crystalline silica, or "no traces" of respirable crystalline silica may be a characterization of the exposure to such respirable crystalline silica according to OSHA regulations. For instance, when finishing an applied joint compound, such as by sanding, an individual may be exposed to respirable crystalline silica. Such characterization may allow for an assessment of the exposure by the individual to the airborne particles of crystalline silica when finishing, in particular sanding, the joint compound on a building product, such as a gypsum board. In particular, when tested according to industry accepted standards, in particular acceptable under OSHA 29 CFR 1926.1153 entitled "Respirable Crystalline Silica", the joint compound disclosed herein shall result in an exposure of 50 $\mu g/m^3$ or less, such as 40 $\mu g/m^3$ or less, such as 30 $\mu g/m^3$ or less, such as 25 $\mu g/m^3$ or less, such as 20 $\mu g/m^3$ or less, such as 15 $\mu g/m^3$ or less, such as 14 $\mu g/m^3$ or less, such as 13 $\mu g/m^3$ or less, such as 12 $\mu g/m^3$ or less, such as 11 $\mu g/m^3$ or less, such as 10 $\mu g/m^3$ or less, such as 9 $\mu g/m^3$ or less, such as 8 $\mu g/m^3$ or less, such as 7 $\mu g/m^3$ or less, such as 6 $\mu g/m^3$ or less, such as 5 $\mu g/m^3$ or less. Generally, the exposure may be 0 $\mu g/m^3$ or more, such as 1 $\mu g/m^3$ or more. Generally, when conducting such testing, an individuals' breathing zone is monitored and samples are collected from that zone using a sampling device. For instance, when expressed as a gravimetric concentration as mentioned above, such concentration is determined from the mass of respirable crystalline silica that is collected on a filter media by a particle-size selective air sampling device. Typically, when analyzing the samples, only those particles having a size of less than 10 microns are considered as only those are considered respirable. In addition, the aforementioned exposure is determined based on an 8-hour time-weighted average, which typically represents a full-shift exposure.

Though FIG. 1 illustrates the use of joint compounds in the setting of joining two boards, it is understood that the compounds may be of use in other applications. As non-limiting examples, joint compounds disclosed herein may also be used to repair cracks in plastered walls, to texture surfaces, and to laminate gypsum board to other surfaces (e.g., masonry, other gypsum boards, and the like).

In another aspect, disclosed herein are methods for joining two or more wallboard panels, the method comprising applying a joint compound formulation described herein to join the two or more wallboard panels.

In another aspect, disclosed herein are methods for joining two or more wallboard panels, the method comprising applying a joint compound formulation comprising no traces of respirable crystalline silica to join the two or more wallboard panels.

In another aspect, disclosed herein are methods for repairing one or more cracks in a plastered wall, the method comprising applying a joint compound formulation described herein to the one or more cracks.

In another aspect, disclosed herein are methods for repairing one or more cracks in a plastered wall, the method comprising applying a joint compound formulation comprising no traces of respirable crystalline silica to the one or more cracks.

In another aspect, disclosed herein are method of laminating gypsum board to another surface, the method comprising applying a layer of joint compound formulation described herein to the gypsum board and affixing the other surface onto the layer of joint compound formulation; or applying a layer of joint compound formulation described herein to the other surface and affixing the gypsum board onto the layer of joint compound formulation.

In another aspect, disclosed herein are method of laminating gypsum board to another surface, the method comprising applying a layer of joint compound formulation comprising no traces of respirable crystalline silica to the gypsum board and affixing the other surface onto the layer of joint compound formulation; or applying a layer of joint compound formulation comprising no traces of respirable crystalline silica to the other surface and affixing the gypsum board onto the layer of joint compound formulation.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A joint compound formulation comprising
about 0.1 wt. % to about 5 wt. % of potassium bitartrate,
about 5 wt. % to about 25 wt. % of at least one latex-free binder selected from the group consisting of starches and starch-based binders,
about 60 wt. % to about 80 wt. % of one or more fillers selected from the group consisting of perlite, calcium carbonate, kaolin, limestone, and attapulgite,
about 1 wt % to about 15 wt. % of one or more thickeners comprising hydroxypropylmethyl cellulose, carboxymethyl cellulose, or a combination thereof,
and 0.1 to 1 wt. % of a preservative, and
wherein the formulation exhibits a coverage rating of about 15 lbs. to cover an area of about 125 square feet and has no mica and/or no talc.

2. The joint compound formulation of claim 1, wherein the one or more fillers selected from the group consisting of Perlite, calcium carbonate, kaolin, and attapulgite.

3. The joint compound formulation of claim 1, wherein the filler is a calcium carbonate and the calcium carbonate is in the form of dolomitic limestone.

4. The joint compound formulation of claim 1, wherein the formulation further comprises one or more additives.

5. The joint compound formulation of claim 4, wherein the one or more additives is selected from the group consisting of antifreeze, plasticizers, suspending agents, and setting timing retardants.

6. The joint compound formulation of claim 1, wherein the formulation has no detectable respirable crystalline silica.

7. The joint compound formulation of claim 1, wherein the formulation has no detectable respirable crystalline silica under OSHA 29 CFR 1926.1153.

8. The joint compound formulation of claim 1, wherein the formulation has less than 0.5 wt% of respirable crystalline silica.

* * * * *